United States Patent
Kiess et al.

(10) Patent No.: US 6,834,538 B2
(45) Date of Patent: Dec. 28, 2004

(54) SPARK PLUG MOUNTED THICK FILM STRAIN GAUGE

(75) Inventors: Ronald J. Kiess, Decatur, IN (US); Lewis Henry Little, Peru, IN (US); Marion E. Ellis, Elkridge, MD (US); Raymond O. Butler, Jr., Anderson, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/682,664

(22) Filed: Oct. 9, 2003

(65) Prior Publication Data

US 2004/0129059 A1 Jul. 8, 2004

Related U.S. Application Data

(60) Division of application No. 10/264,068, filed on Oct. 3, 2002, now Pat. No. 6,679,100, which is a continuation-in-part of application No. 09/799,362, filed on Mar. 5, 2001, now Pat. No. 6,799,451.

(51) Int. Cl.$^7$ .............................................. G01M 15/00
(52) U.S. Cl. ....................................................... 73/115
(58) Field of Search .......................... 73/112, 115, 116, 73/117.2, 117.3, 118.1, 35.01, 35.07, 35.12

(56) References Cited

U.S. PATENT DOCUMENTS

| | | | |
|---|---|---|---|
| 4,480,478 A | 11/1984 | Sato et al. | 73/708 |
| 4,909,071 A | 3/1990 | Amano et al. | 73/115 |
| 4,986,131 A | 1/1991 | Sugiyama et al. | 73/766 |
| 5,062,294 A * | 11/1991 | Iwata | 73/115 |
| 5,181,417 A * | 1/1993 | Nishida et al. | 73/115 |
| 5,479,817 A * | 1/1996 | Suzuki et al. | 73/115 |
| 5,672,812 A | 9/1997 | Meyer | 73/35.07 |
| 5,712,424 A | 1/1998 | Reed | 73/115 |
| 5,747,677 A * | 5/1998 | Tomisawa et al. | 73/115 |
| 5,777,468 A | 7/1998 | Maher | 324/207.18 |
| 5,898,359 A | 4/1999 | Ellis | 338/47 |
| 5,914,593 A | 6/1999 | Arms et al. | 324/207.12 |
| 6,094,990 A | 8/2000 | Lykowski et al. | 73/714 |
| 6,119,667 A | 9/2000 | Boyer et al. | 123/634 |
| 6,378,384 B1 | 4/2002 | Atkinson et al. | 73/862.625 |
| 6,668,632 B2 * | 12/2003 | Ford et al. | 73/118.1 |
| 2002/0121127 A1 * | 9/2002 | Kiess et al. | 73/35.07 |
| 2002/0183919 A1 * | 12/2002 | Matsui et al. | 701/114 |
| 2002/0189334 A1 * | 12/2002 | Ford et al. | 73/118.1 |
| 2004/0083795 A1 * | 5/2004 | Butler et al. | 73/35.12 |

* cited by examiner

Primary Examiner—Eric S. McCall
(74) Attorney, Agent, or Firm—Jimmy L. Funke

(57) ABSTRACT

A thick film resistor strain gauge is applied to a stainless steel shell portion of a spark plug. There are two preferable ways of applying a thick film resistor to the metal shell. In a first embodiment, the thick film resistor may be directly printed on to the shell portion with special screen printing equipment. In a second embodiment, the thick film resistor is printed and applied as a decal to the shell portion. The thick film resistors may be included in a quarter, a half, or a full wheatstone bridge strain gauge circuit. One of two embodiments of an automatic drift compensating circuit is used to determine the change in resistance experienced by the thick film resistors affixed to the spark plug. Either one of the automatic drift compensation circuits output a voltage signal which is proportional to the pressure changes occurring inside the engine cylinder into which the spark plug is threaded.

6 Claims, 4 Drawing Sheets

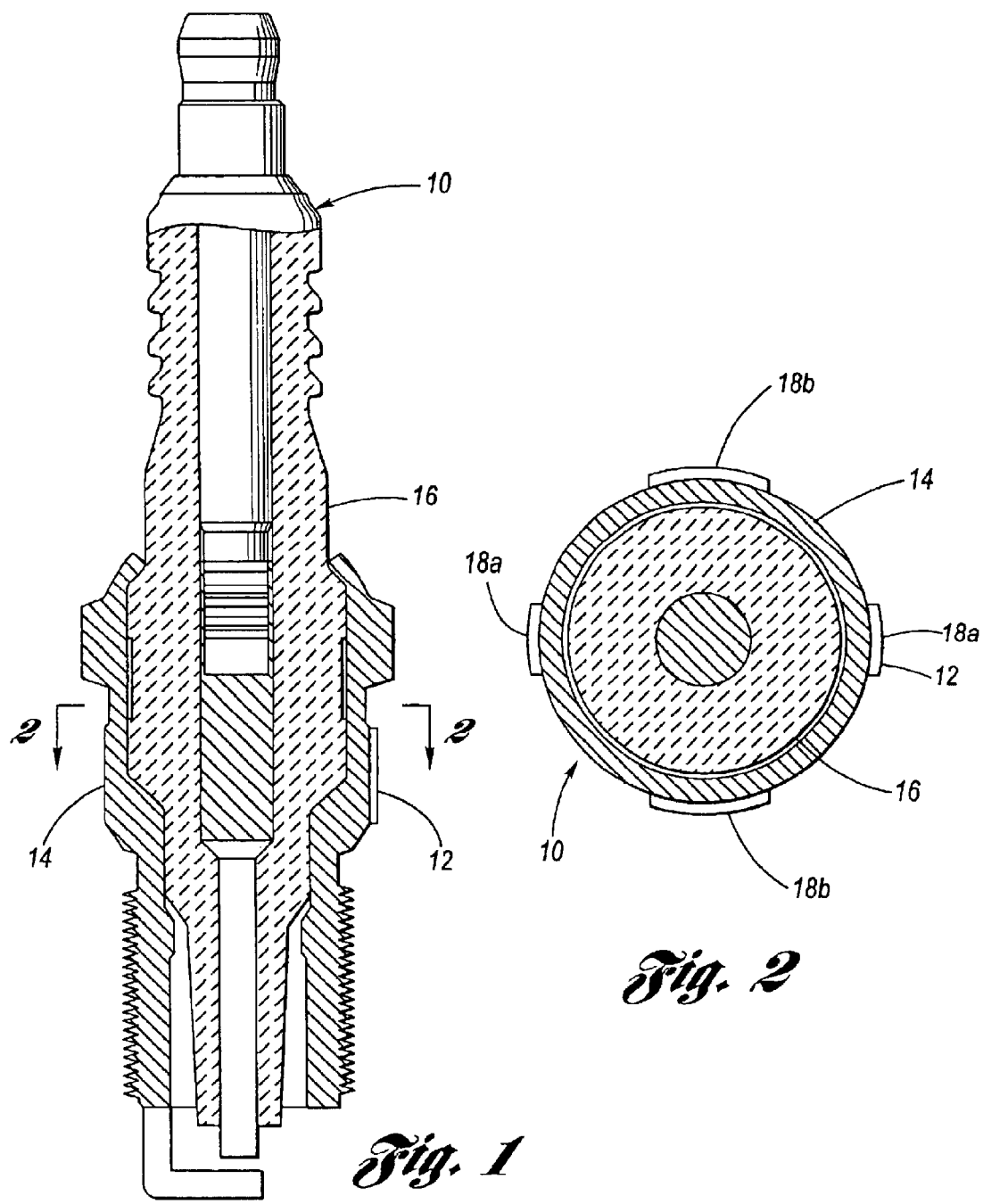

SPARK PLUG MOUNTED THICK FILM STRAIN GAUGE

CROSS-REFERENCE TO RELATED APPLICATIONS

The present application is a continuation-in-part of patent application U.S. Ser. No. 09/799,362 filed Mar. 5, 2001, which application is now U.S. Pat. No. 6,799,451.

The present application is a divisional of application Ser. No. 10/264,068 filed on Oct. 3, 2002, now U.S. Pat. No. 6,679,100.

TECHNICAL FIELD

The present invention relates generally to strain gauges and more specifically to a spark plug mounted thick film strain gauge that allows the pressure in an engine cylinder to be monitored.

BACKGROUND OF THE INVENTION

A strain gauge mounted to a spark plug shell yields an excellent representation of the engine cylinder pressure with high signal-to-noise ratio. However, commercial strain gauges have a gauge factor of approximately 2. A gauge factor of 2 will provide a typical signal level of only a few microvolts. Using a commercially available strain gauge would require a very high degree of amplification. Strain gauges fabricated from thick-film resistors have gauge factors of between 10 to 20, which produces a signal level which is 5 to 10 times greater than commercially available strain gauges.

What remains in the art is a spark plug mounted thick film strain gauge which provides a higher magnitude of electrical signal than that of commercially available strain gauges.

SUMMARY OF THE INVENTION

The present invention is a spark plug mounted thick film strain gauge which requires less amplification than that of the prior art. The thick film strain gauge is applied to a metal (ie., stainless steel) shell of a spark plug. There are two preferable ways of applying a thick film strain gauge to the metal shell in axial and circumferential orientations. In a first embodiment, a thick film resistor may be directly printed onto the metal shell with special screen printing equipment. Each layer of the thick film resistor is printed, allowed to dry, and fired in a kiln to fix the ink to the metal shell, or the previous layer. In a second embodiment, a thick film resistor is printed and applied as a decal to the metal shell. The spark plug is then fired in a kiln to fix the thick film resistor to the metal shell.

The thick film resistors may be included in a quarter, a half, or a full wheatstone bridge strain gauge circuit. A single thick film resistor is used in a quarter wheatstone bridge circuit; two thick film resistors are used in a half wheatstone bridge circuit; and four thick film resistors are used in a full wheatstone bridge circuit. The full wheatstone bridge circuit offers a signal output which is multiplied by as much as four times, and the half wheatstone bridge circuit offers a signal output which is multiplied by as much as two times, the output of the quarter wheatstone bridge circuit. With a full wheatstone bridge circuit, four thick film resistors must be applied to the metal shell.

An automatic drift compensating circuit is used to monitor the change in resistance experienced by the thick film resistors affixed to the spark plug. The automatic drift compensating circuit includes an input amplifier, a compensating amplifier and an output amplifier. The output of the wheatstone bridge circuit is input to the input amplifier. The output of the input amplifier is input to the compensation amplifier. The output of the input amplifier and the compensation amplifier is input to the output amplifier. The output amplifier outputs a voltage signal which is proportional to the pressure changes occurring inside the engine cylinder into which the spark plug has been threaded. A second embodiment of an automatic drift compensating circuit includes a first input amplifier, a second input amplifier, and an output amplifier. The output of the wheatstone bridge circuit is input into the first and second input amplifiers. The outputs of the first and second input amplifier are input into the output amplifier.

Accordingly, it is an object of the present invention to provide a spark plug mounted thick film strain gauge which provides a higher magnitude electrical signal than commercially available strain gauges.

This and additional objects, features and advantages of the present invention will become clearer from the following specification of a preferred embodiment.

BRIEF DESCRIPTION OF THE DRAWINGS

FIG. 1 is an axial cross-sectional view of a spark plug with a thick film resistor strain gauge attached to a metal shell thereof.

FIG. 2 is a cross-sectional view of a spark plug, seen as in line 2—2 of FIG. 1, now depicting four thick film resistor strain gauges attached to the metal shell.

DESCRIPTION OF THE PREFERRED EMBODIMENT

Figure 3A:
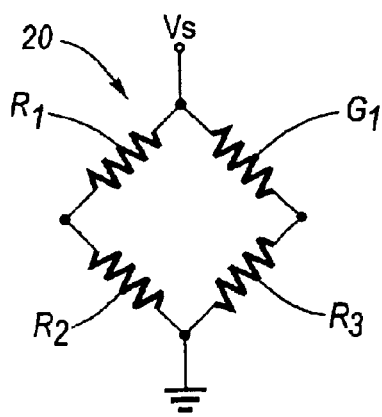
FIG. 3A is a schematic diagram of a quarter wheatstone bridge circuit used to measure strain of a spark plug.

Referring now to the Drawings, FIG. 1 shows an axial cross-sectional view of a spark plug 10 with a thick film strain gauge 12 attached to a metal (ie., stainless steel) shell 14 thereof. The spark plug 10 further has a ceramic cylinder 16 which locates a positive electrode. The metal shell 14 tightly engirds a portion of the ceramic cylinder 16, wherein a threaded portion of the metal shell carries the negative electrode.

There are two preferable ways of applying a thick film strain gauge 12 to the metal shell 14. In a first embodiment, one or more thick film resistors may be directly printed on to the metal shell 14 with special screen printing equipment. Preferably, the thick film resistors are formed on the metal shell 14 by the following process. Firstly, two dielectric layers are printed, dried, and fired on the metal shell 14. Then, a conductor layer is printed, dried, and fired on the last dielectric layer. Finally, a piezoresistor ink is printed, dried, and fired on the conductor layer. In a second embodiment, at least one thick film resistor is printed and applied as a decal to the metal shell 14. The spark plug is then fired in a kiln to fix the thick film resistor to the metal shell.

With reference to FIG. 2, two axial thick film resistors 18a and two hoop thick film resistors 18b are affixed to the metal shell 14, using one or the other of the above affixment methods. The two axial thick film resistors 18a measure axial strain of the spark plug 10 induced by engine cylinder combustion pressure. The two hoop thick film resistors 18b measure hoop strain of the spark plug 10 induced by engine cylinder combustion pressure. The two axial and hoop thick film resistors are respectively shown in FIG. 2 as being mutually opposed. However, the position of the thick film resistors on the metal shell 14, or the relative position of the thick film resistors with respect to each other, is depicted merely by way of example and not by way of limitation. Further, four axial thick film resistors may also be used instead having two axial thick film resistors and two hoop thick film resistors.

Figure 3B:
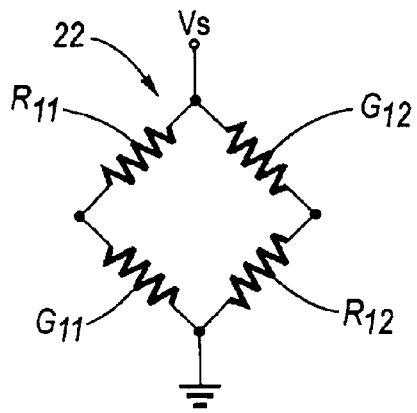
FIG. 3B is a schematic diagram of a half wheatstone bridge circuit used to measure strain of a spark plug.
Figure 3C:
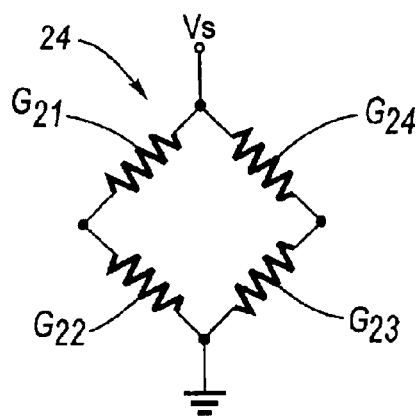
FIG. 3C is a schematic diagram of a full wheatstone bridge circuit used to measure strain of a spark plug.

With reference to FIGS. 3A through 3C, the thick film resistors may be included in a quarter, a half, or a full wheatstone bridge strain gauge circuit. While it is obvious, it is instructive to point out that in the wheatstone bridge circuit, only the thick film resistors serve as strain transducers, the regular resistors not serving as strain transducers and are used to balance the quarter and half wheatstone bridge circuits.

A quarter wheatstone bridge circuit 20 is depicted at FIG. 3A, and includes three regular resistors $R_1$, $R_2$, $R_3$ and one thick film resistor $G_1$. A half wheatstone bridge circuit 22 is depicted at FIG. 3B, and includes two regular resistors $R_{11}$, $R_{12}$ and two thick film resistors $G_{11}$, $G_{12}$. A full wheatstone bridge circuit 24 is depicted at FIG. 3C, and includes four thick film resistors $G_{21}$, $G_{22}$, $G_{23}$, $G_{24}$. The wheatstone full bridge circuit 24 offers a signal output which is multiplied by as much as four times, and the half wheatstone bridge circuit 22 offers a signal output which is multiplied by as much as two times, over that of the quarter wheatstone bridge circuit 20. Of course, a consideration is that the full wheatstone bridge circuit involves affixment of four thick film resistors to the spark plug 10.

Figure 4A:
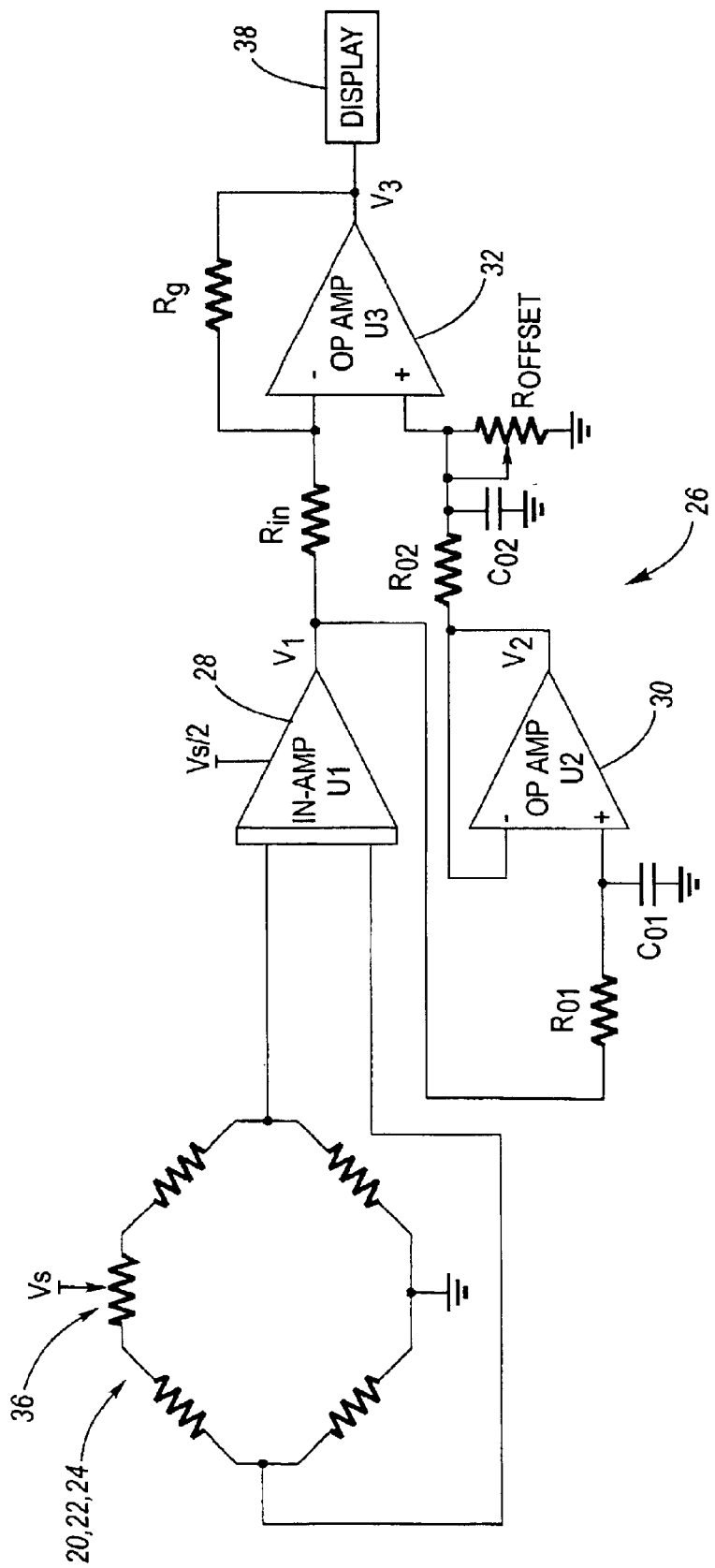
FIG. 4A is a schematic diagram of an automatic drift compensation circuit used to measure strain of a spark plug.

An automatic drift compensating circuit 26, shown at FIG. 4A, is used to determine the change in resistance experienced by the thick film resistors affixed to the spark plug 10 due to strain. The thick film resistors are part of a quarter, half or full wheatstone bridge circuit 20, 22, 24, as described above. The automatic drift compensating circuit 26 includes an input amplifier 28, a compensating amplifier 30, and an output amplifier 32. The voltage input $V_s$ to the wheatstone bridge circuit is adjusted by a potentiometer 36.

In operation, the output of a quarter, half, or full wheatstone bridge 20, 22, 24 is input to the input amplifier 28 which is in the form of an instrumentation amplifier, which generally consists of two or three operational amplifiers in a manner which is well known in the art. The output of the input amplifier 28 is input to the compensation amplifier 30 and the output amplifier 32. The input amplifier is supplied with a reference voltage $V_s/2$ which establishes a quiescent output voltage of the input amplifier as equal to $V_s/2$. The compensation amplifier 30 is configured as a unity-gain follower. Voltage $V_1$ is input to the compensation amplifier 30 and filtered by resistor $R_{O1}$ and capacitor $C_{O1}$. The compensation amplifier 30 outputs a voltage $V_2$ which is input to the positive terminal of the output amplifier 32. The input potentiometer 36 is used to balance voltage $V_1$ to voltage $V_2$ such that $V_1=V_2=V_s/2$. The voltage $V_2$ is filtered by resistor $R_{O2}$ and capacitor $C_{O2}$.

The output amplifier 32 is configured as a differential amplifier. The voltage $V_1$ is input to the negative terminal of the output amplifier 32 through input resistor $R_{in}$. Gain resistor $R_g$ provides the output amplifier 32 with an output voltage of $V_3$. Offset resistor $R_{offset}$ is adjusted such that $V_3=V_s/10$ when the pressure inside the engine cylinder is equal to zero. The variation in voltage signal is used, such as for example via a display 38 (ie., a memory oscilloscope) to monitor the pressure readings inside the engine cylinder without having a pressure sensor penetrating the cylinder.

Figure 4B:
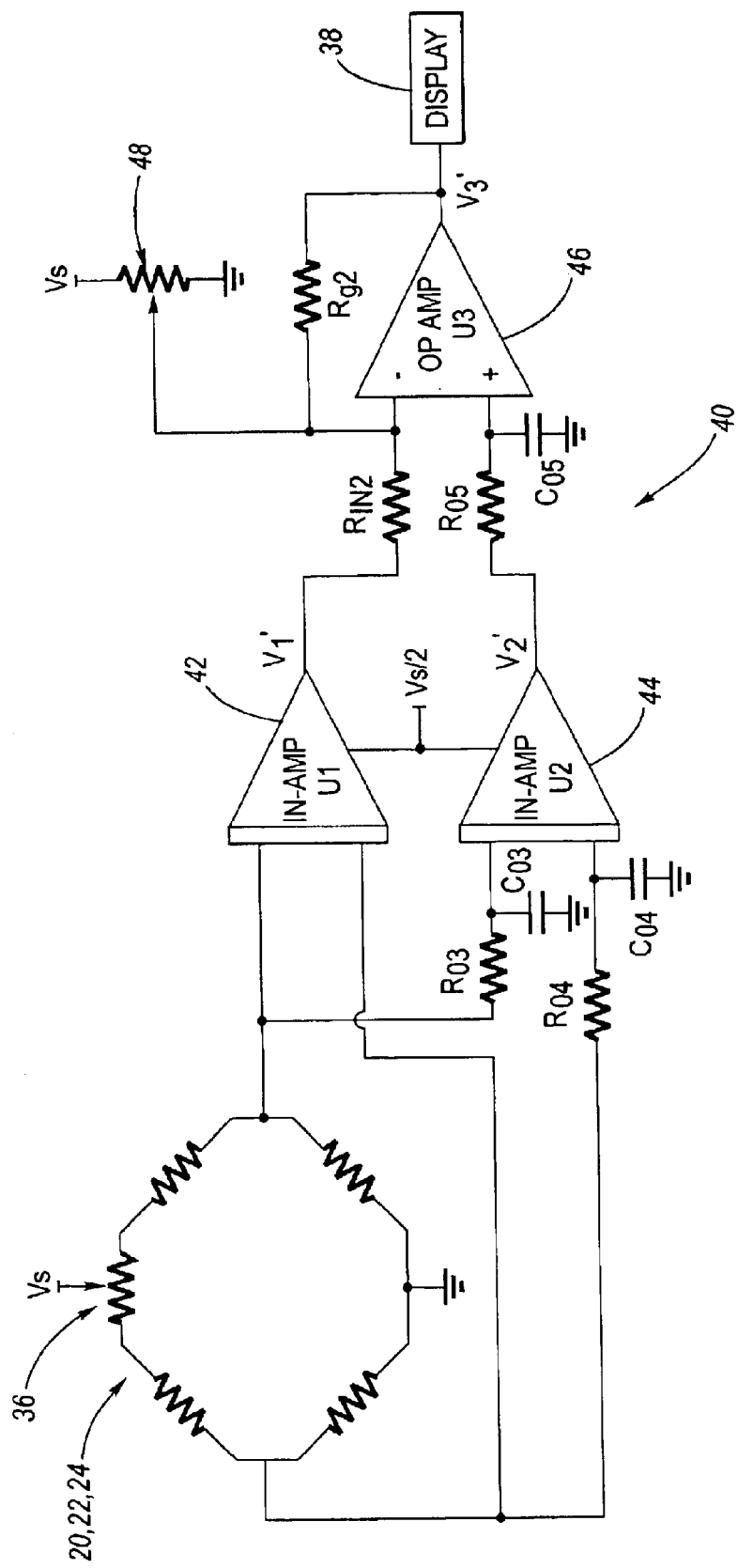
FIG. 4B is a schematic diagram of a second embodiment of an automatic drift compensation circuit used to measure strain of a spark plug.

A second embodiment of an automatic drift compensating circuit 40, shown at FIG. 4B, may also be used to determine the change in resistance experienced by the thick film resistors affixed to the spark plug 10 due to strain. The thick film resistors are part of the quarter, half or full wheatstone bridge circuit 20, 22, 24, as described above. The automatic drift compensating circuit 40 includes a first input amplifier 42, a second input amplifier 44, and an output amplifier 46. The voltage input $V_s$ to the wheatstone bridge circuit is adjusted by the potentiometer 36.

In operation, the output of the quarter, half, or full wheatstone bridge 20, 22, 24 is input into the first input amplifier 42 and the second input amplifier 44 which are both in the form of an instrumentation amplifier, which generally consists of two or three operational amplifiers in a manner which is well known in the art. One input terminal of the second input amplifier 44 is filtered with resistor $R_{O3}$ and capacitor $C_{O3}$ and the other input terminal is filtered with resistor $R_{O4}$ and capacitor $C_{O4}$. The first and second input amplifiers are supplied with a reference voltage $V_s/2$ which establishes a quiescent output voltage of the input amplifiers as equal to $V_s/2$.

A negative terminal of the output amplifier 46 is supplied by the output of the first input amplifier 42 through a resistor $R_{in2}$. The voltage $V_2'$ is filtered by resistor $R_{O5}$ and capacitor $C_{O5}$. A positive terminal of the output amplifier 46 is supplied by the output of the second input amplifier 44 and voltage $V_s$ through offset potentiometer 48. The input potentiometer 36 is used to balance voltage $V_1'$ to voltage $V_2'$ such that $V_1'=V_2'=V_s/2$.

The output amplifier 46 is configured as a differential amplifier. Gain resistor $R_{g2}$ provides the output amplifier 46 with an output voltage of $V_3$. Offset potentiometer 48 is adjusted such that $V_3'=V_s/10$ when the pressure inside the engine cylinder is equal to zero. The variation in voltage signal is used, such as for example via a display 38 (ie., a memory oscilloscope) to monitor the pressure readings inside the engine cylinder without having a pressure sensor penetrating the cylinder.

Figure 5:
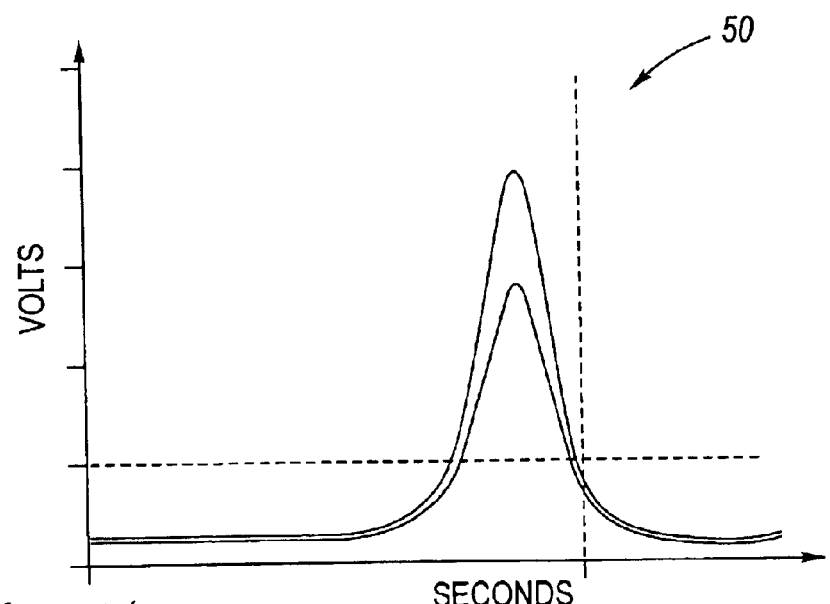
FIG. 5 is an example of a graphical display of an output of the thick film resistor strain gauge according to the present invention.

FIG. 5 depicts an example of a graphical output 50 of a display showing a combustion event, wherein the spark plug has a half wheatstone bridge circuit according to the present invention. The vertical axis is in volts, which corresponds to cylinder pressure (ie., psi, bars, etc.), and the horizontal axis is in seconds, which corresponds to crank angle at constant engine speed.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A method of measuring a change in pressure inside an engine cylinder during combustion, said method comprising the steps of:

affixing at least one thick film resistor to a metal shell of a spark plug that provides combustion ignition to the engine cylinder;

including said at least one thick film resistor in a wheatstone bridge circuit;

applying a voltage to said at least one thick film resistor;

monitoring a change in resistance of said at least one thick film resistor in response to change in strain of the spark plug to sense change in pressure during combustion inside the engine cylinder; and amplifying the change in resistance of said at least one thick film resistor with an automatic drift compensating circuit;

wherein said step of amplifying comprises:

comparing the voltage from each said of said wheatstone bridge circuit to produce a first voltage output and a second voltage output:

inputting said first and second voltages into an amplifier, said first amplifier producing a third voltage output:

balancing said first voltage output with said second voltage output: and adjusting the output of said amplifier to a predetermined level when pressure in side the engine cylinder is equal to zero.

2. The method of measuring a change in pressure inside an engine cylinder during combustion of claim 1, further comprising the step of:

orienting said at least one thick film resistor such that it measures axial stain of the spark plug.

3. The method of measuring a change in pressure inside an engine cylinder during combustion of claim 1, further comprising the step of:

orienting said at least one thick film resistor such that it measures hoop stain of the spark plug.

4. The method of measuring a change in pressure inside an engine cylinder during combustion of claim 1, wherein said step of including comprises including said at least one thick film resistor in a selected one of a quarter wheatstone bridge circuit, a half wheatstone bridge circuit and a full wheatstone bridge circuit.

5. The method of measuring a change in pressure inside an engine during combustion of claim 4, further comprising the step of:

orienting said at least one thick film resistor, said orientation being selected for measuring at least one of axial strain of the spark plug and hoop strain of the spark plug.

6. A method of measuring a change in pressure inside an engine cylinder during combustion, said method comprising the steps of:

orienting at least one thick film resistor said orientation being selected for measuring one of axial strain of the spark plug and hoop strain of the spark plug; affixing said at least one thick film resistor to a metal shell of a spark plug that provides combustion ignition to the engine cylinder;

including said at least one thick film resistor in a wheatstone bridge circuit, wherein said wheatstone, bridge circuit comprises a selected one of a quarter wheatstone bridge circuit, a half wheatstone bridge circuit and a full wheatstone bridge circuit;

applying a voltage to said at least one thick film resistor;

monitoring a change in resistance of said at least one thick film resistor in response to change strain of the spark plug to sense change in pressure during combustion inside the engine cylinder; and amplifying the change in resistance of said at least one think film resistor with an automatic drift compensating circuit;

wherein said step of amplifying comprises:

comparing the voltage from each side of said wheatstone bridge circuit to produce a first voltage output and a second voltage output;

inputting said first and second voltages into an amplifier, said fist amplifier producing a third voltage output;

balancing said first voltage output with said second voltage output; and adjusting the output of said amplifier to a predetermined level when pressure in side the engine cylinder is equal to zero.

* * * * *